United States Patent

[11] 3,556,494

| [72] | Inventor | Martin R. Cines<br>Bartlesville, Okla. |
|---|---|---|
| [21] | Appl. No. | 783,656 |
| [22] | Filed | Dec. 13, 1968 |
| [45] | Patented | Jan. 19, 1971 |
| [73] | Assignee | Phillips Petroleum Company<br>a corporation of Delaware |

[54] UNIFORM TEMPERATURE CONDITIONING OF PARISONS IN VAPOR HEATED DEVICE
9 Claims, 2 Drawing Figs.

[52] U.S. Cl. .................................................... 263/7,
263/4
[51] Int. Cl. .................................................... F27b 9/16
[50] Field of Search ........................................ 263/7, 2, 4;
78/(Preheat Digest)

[56] References Cited
UNITED STATES PATENTS

| 2,376,655 | 5/1945 | Brotz ........................... | 263/2 |
| 2,969,577 | 1/1961 | Laforest ....................... | 263/7 |

*Primary Examiner*—John J. Camby
*Attorney*—Young and Quigg

ABSTRACT: Parison preforms are placed within a parison-receiving means which is carried by a hollow sealed heating block. The heating block is subjected to a source of heat to vaporize a liquid contained therein which thus formed vapors heat the parison receiving means. For instance, a hollow wheel has tubular inserts into which parisons are positioned. As the wheel turns, liquid in the bottom of the wheel is heated and the vapors surround the inserts which hold the parisons.

PATENTED JAN 19 1971

3,556,494

INVENTOR.
M. R. CINES

BY Young & Quigg

ATTORNEYS

UNIFORM TEMPERATURE CONDITIONING OF PARISONS IN VAPOR HEATED DEVICE

BACKGROUND OF THE INVENTION

This invention relates to a method and apparatus for the uniform heating of preformed parisons.

While the blow-molding art goes back over 100 years, it has only been in the last dozen years that the blow molding of hollow articles with plastic resins has achieved significant commercial success. With this expanded utilization of blow-molding techniques has come progressively more rigorous requirements from the purchasers of the finished product with regard to the appearance, durability, chemical resistance, low cost and the like, of the product.

It is well known that many organic polymers which are particularly suitable for blow molding, such as the olefin polymers, undergo the phenomenon known as orientation when stretched in the solid state at a temperature below their crystalline melting point. Since the greatest orientation occurs at a temperature just below the crystalline melting point to which the polymer has been heated and while the polymer is in a partially crystalline state, it was early recognized that little orientation could be effected in a conventional blow-molding operation wherein a molten parison was extruded between mold halves and blown; first, the temperature of the parison precluded any practical degree of orientation and second, the slight orientation achieved was predominantly in the circumferential direction, since little or no stretching in the longitudinal direction occurred.

Even when preformed parisons are heated, it has been found that uniform heating of the parison preforms to a temperature within a rather narrow temperature range just below the crystalline melting point is essential to the successful formation of uniformly biaxially oriented articles. Further, it has been found that such uniform heating is exceedingly difficult to obtain.

SUMMARY OF THE INVENTION

It is an object of this invention to provide a means for the uniform heating of thermoplastic parison; it is a further object of this invention to provide precise control of the temperature of a heating means for preformed parisons; and it is a yet further object of this invention to provide a simplified device for heating preformed parisons to orientation temperature.

In accordance with the present invention, parison-receiving means within a sealed heating block are heated by means of condensing vapors.

BRIEF DESCRIPTION OF THE DRAWINGS

In the drawings forming a part hereof, wherein like reference characters denote like parts in the various views.

DESCRIPTION OF THE PREFERRED EMBODIMENTS

Figure 2:
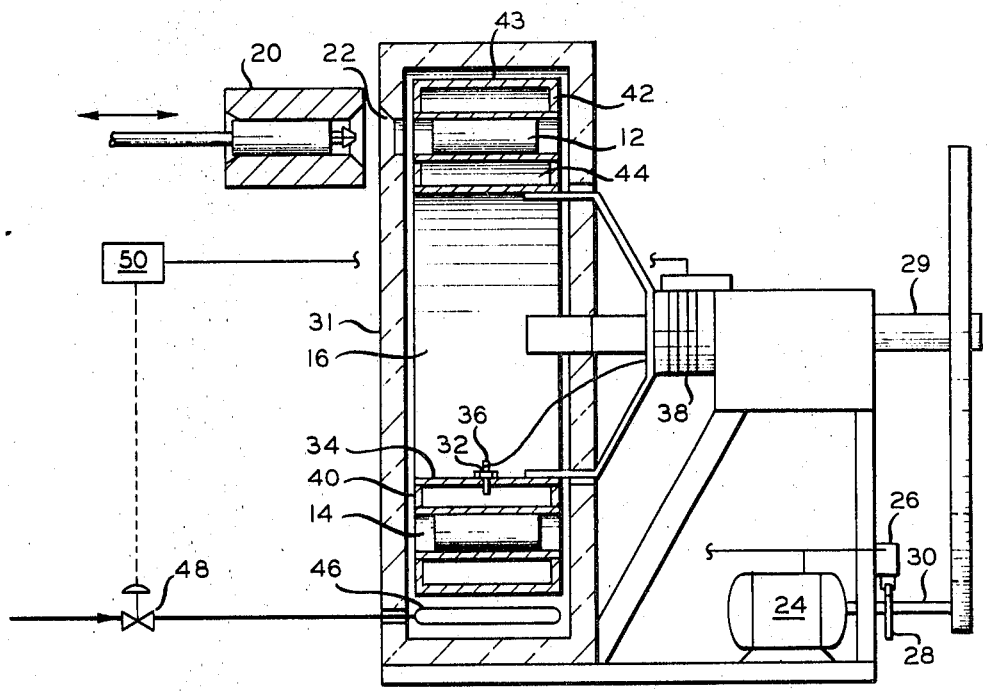
FIG. 2 is a cross section along a section line 2–2 of FIG. 1.

The apparatus of this invention is applicable for the heating of any type of elongated articles and particularly applicable in the conditioning of thermoplastic parisons for use in the formation of biaxially oriented hollow thermoplastic articles such as bottles and other containers.

The parisons can be formed from any orientable thermoplastic resin. Examples of suitable resins include polymers and copolymers of 1-olefins, poly(vinyl chloride), and the like. The preferred material are polymers and copolymers of ethylene, propylene, and 1-butene, with polypropylene being especially preferred. These polymers are extruded or molded into parison preforms and cooled to a temperature below the crystalline freezing point. A preferred method of forming these parisons is to simply extrude a continuous length of tubing which is thereafter severed into sections of measured length.

These parisons are then heated to orientation temperature which is generally about 1 to 50, preferably 2 to 20° F. below their crystalline melting temperature by utilization of the heater of the instant invention.

The parison heater of the instant invention is useful for heating parisons of any thickness. Generally, the parisons will be from 10 to 500, preferably 120 to 175, mils in wall thickness.

The temperature conditioned parison is thereafter transferred to a molding station for fabrication into the desired article. At this molding station, the parisons are gripped at one end and closed off and gripped at the other end and stretched longitudinally to impart longitudinal orientation by means of relative axial movement between the two gripping means; they are then caused to expand to conform to the shape of a mold by the application of a pressure differential between the interior of the parison and the mold wall, thus imparting circumferential orientation to give a biaxially oriented product. This orientation process imparts as much as a 20-fold increase in the tensile strength to the plastic material. In the case of molded parisons having a closed end, the operation whereby one end is closed off can be eliminated, of course.

By the term "molding station" as used throughout the specification, is meant either a single station where the heated parison is introduced into a mold and expanded by means of a differential fluid pressure or a two or three stage-molding station wherein the parison is first stretched longitudinally to impart longitudinal orientation and then is introduced into a mold and caused to conform to the shape of the mold by the introduction of fluid pressure into the interior of the parison. At some stage during this operation, the portion (if any) of the parison between the area molded and the end of the parison is severed and discarded.

The crystalline melting point can be determined by heating a sample of the material under a polarizing microscope. The specimen is heated slowly, and the point at which the last birefringence disappears is the crystalline melting point.

Preferably, the hollow heating block of the instant invention is in the form of a wheel. This hollow wheel can contain one or more rows of holes through the wheel concentric with the axis. These holes form a parison receiving means and are defined by tubular inserts having the same internal shape and size as the external shape of the parison, said inserts being sealed to the plates forming the front and back of the wheel so that there is no open communication between the interior of the wheel and the outside. Thus, heat is imparted to the parison by means of conduction. A small amount of fluid is sealed within the wheel and the wheel heated, generally by means of a separate gas burner or radiant electrical resistance heater spaced just below the wheel, so as to vaporize a portion of the fluid. Heating the wheel in this manner provides the dual advantage of eliminating the need for sliding electrical contacts, such as are required when the wheel is heated by internal resistance heaters, and at the same time providing greater uniformity of heating because of the inherent uniform nature of the heating effected by the condensing vapors in the rotating wheel. While the wheel could be heated from the inside which would not affect the uniformity of the heating, it is preferred to use an external heater so as to eliminate sliding contacts carrying large amounts of current.

When two concentric sets of holes are utilized, means can be provided for shifting the entire wheel laterally a distance equal to the radial spacing between the holes so as to align each set of holes with the parison insertion and receiving means or the inserting and extracting means may be moved a radial distance equal to this spacing. The means for imparting heat to the heating block can be any conventional-heating means such as a gas burner or radiant resistance-type heater.

The heater wheel can be constructed of any structurally stable material which is not affected by the temperature of the heating means and the heating fluids employed. Stainless steel is a particularly suitable material since it is strong, corrosive resistant, and a relatively poor conductor of heat relative to metals such as copper, so that the introduction of cold parisons into the wheel would not affect the temperature of the parisons which are ready to be removed.

The parison-receiving tubes can also be made of any material which is relatively uneffected by, and impermeable to, the heating liquid. While metals such as copper are preferred because of their excellent heat transfer, other materials can be used since the tubes can be relatively thin. A wall thickness in the range of 20 to 300 mils, for instance, can be utilized in these tubes. Thus the tubes can be made of stainless steel, other metals and alloys, or even structural plastics such as polyphenylene sulfide which are resistant to high temperatures and which have a low coefficient of friction, thus allowing insertion and removal of the parison from the tubes without damage to the parisons.

If desired, supplemental heat can be imparted to the interior of the parisons, for instance by circulating heated air through the parisons or by utilizing an elongated internal radiant-heating means. In the instance where air is circulated through the interior of the parison, means can be provided for circulating the air first in one direction and then in the other so as to achieve the most uniform heating of the ends of the parison. By heating the parison with supplemental heat from the interior, the inner surface can be heated to a higher temperature such that the inner surface only is molten so as to be more easily sealable.

Any condensable fluid can be utilized as the fluid within the heating block. Preferably, noncondensable gaseous materials are removed prior to sealing the unit. Water is a preferred heating fluid, particularly when heating polyolefin parisons. Among other suitable fluids are hydrocarbons such as normal octane, 2,5-dimethyl hexane, n-nonane, toluene, ethyl benzene, 1,2-dimethyl benzene, 1,3-dimethyl benzene, 1,4-dimethyl benzene, styrene, and isopropylbenzene.

A preferred method of regulating the temperature within the hollow heating block is by means of a pressure transducer such as a Series 316 pressure transducer available from Consolidated Electrodynamics Corporation. In the case of a rotating wheel type of heating block, the sliding contacts necessary for the electrical connections to the transducer present no problem, since the amount of current is low. Controlling the temperature in response to changes in pressure offers the advantage of achieving more uniform control of the temperature since, by the very nature of a gaseous fluid system, the pressure is relatively constant throughout the volume whereas the temperature can vary widely due to localized hot spots or cold spots. In an operation such as this, where the material being heated must be heated to a critical, rather narrow, temperature range, a slight increase in sensitivity and uniformity is highly significant. The pressure change at the temperatures involved will generally be over 1 p.s.i. per degree so that very fine control of the temperature is possible. It is within the broad scope of the invention to utilize other methods of temperature control however. One such method is by direct measurement and control of the temperature with a thermistor in combination with a Proportioning SCR (Silicon Controlled Rectifier) Temperature Controller with thermistor input similar to Model 226 available from Assembly Product Inc. 11655 Chillicothe Road, Chesterland, Ohio, controlling the electrical input to a radiant-heating unit.

The means for inserting the parison into the heating wheel can also serve as the means for removing the parison after the heating step or a separate parison removing means can be provided.

Referring now to the FIGS. a tubular thermoplastic parison 12 at room temperature is inserted into tube 14 of heater wheel 16 at loading station 18 (not shown in FIG. 2). At the same time, a heated parison is removed by parison-removing means 20 at parison extraction station 22. The parison introduction means may be identical to the parison-removing means 20 or it may comprise simply a pusher rod and an appropriately shaped channel to guide the parisons or it may be inserted by hand. The parison-removing means 20 serves also as a parison transfer mechanism to convey the parison from the heating device to the molding station (not shown). After the parison has been removed at station 22 and a new parison inserted at station 18, drive motor 24 is energized by a limit switch (not shown) on the blow-molding machine to start the next indexing cycle. Switch 26 is then closed by the action of cam 28 on drive shaft 30 of drive motor 24, so that drive motor continues to run after the switch on the blow-molding machine is opened until switch 26 is opened by the action of cam 28 at the completion of the indexing cycle. Wheel 16 thus rotates in measured increments about axis 29. With a wheel having one row of parison-receiving means, the speed of rotation will be such that the parison is heated in approximately one rotation. Generally, this will be one rotation every 1—20 minutes, preferably one rotation every 5—10 minutes.

The heater wheel is constructed of stainless steel plate and tubing. Outer cover 31 serves as an insulation to conserve heat. A threaded opening 32 is provided on inner cylindrical hub portion 34 for insertion of a pressure-measureing device such as transducer 36. The energizing voltage to the transducer and the signal from the transducer pass through slip ring 38. Side plates 40 and 42 of wheel 16 are welded to the ends of tubes 14 and to inner cylindrical portion 34 as well as to peripheral wall 43 so that annular hollow portion 44 is sealed and therefore not opened to the atmosphere. Hollow portion 44 which constitutes the heating zone is evacuated to remove noncondensable gases and charged with a sufficient quantity of a condensable fluid such that at operating temperature, the level of liquid at the bottom of the wheel is below the surface of heater tubes 14 which constitute the parison-holding zones. Gas heater 46 heats the lower portion of the heater wheel in the zone which is covered by the liquefied portion of the fluid. The flow of fuel to the burner is controlled by a motor valve 48 or a diaphragm valve in response to an air pressure signal from a millivolt-to-air pressure-type converter 50. Controller 50 can be a Taylor model 760 low volt-to-pressure transmitter, for instance, available from Taylor Instrument Companies, Rochester, New York. This converter receives a millivolt signal proportional to the pressure in the heater wheel from the pressure transducer 36 and converts it to a pressure signal which controls the opening of fuel valve 48 so as to decrease or shut off the flow of fuel if the pressure rises above a preselected pressure, and to increase or turn on the flow of fuel if the pressure falls below a preselected value.

The pressure which is to be maintained in the wheel is the vapor pressure of the fluid in the wheel at the desired temperature to which the parisons are to be heated. For instance, if the temperature to which the parisons are to be heated is 330° F. and water is the fluid in the wheel, the selected pressure to be maintained would be the vapor pressure of water at 330° F. or 103.06 p.s.i. absolute.

Figure 1:
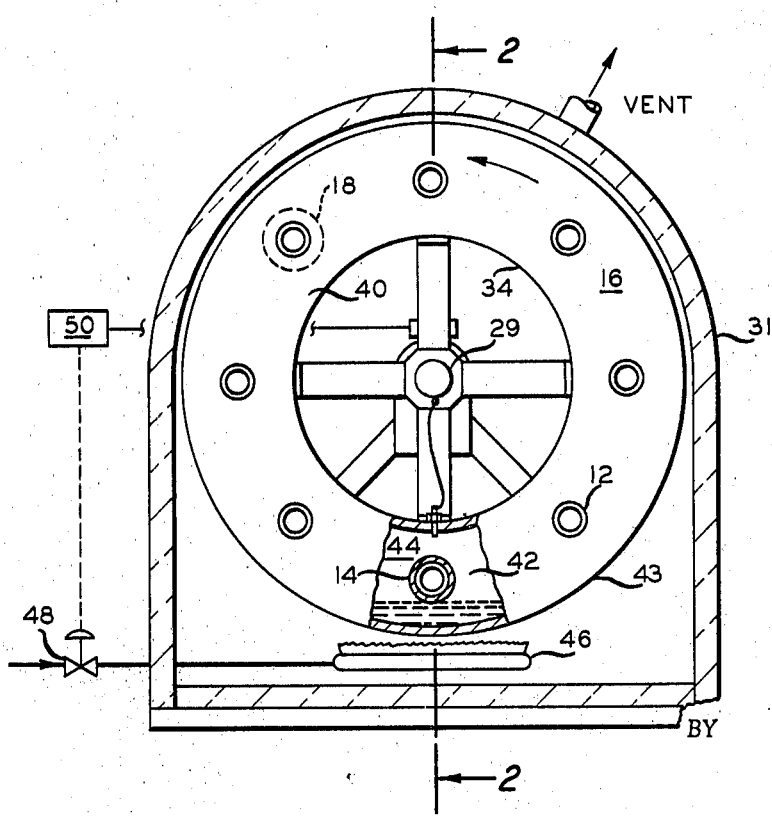
FIG. 1 is a side elevation partly in section of a heating apparatus in accordance with the instant invention.

As the vapors condense at essentially constant temperature on the tubes containing the parisons, they give up their heat of condensation to the tubes at essentially constant temperature. The condensate then falls to the bottom of the wheel to be reevaporated. It can be seen from FIG. 1 that the cold parisons are inserted at a point where condensate from the tube carrying a cold parison does not fall on a tube carrying a parison which is ready to be removed. If desired, drip guards can be provided to prevent condensate from one tube falling on another tube. More vapor condenses on the cooler tubes, thus heating them more readily than the warmer tubes. As the vapors condense and run off, more vapor at essentially the same temperature is immediately available by convection due to the large change in volume as the vapor condenses at the tube wall. Very accurate and precise temperature conditioning of the parisons is therefore possible.

EXAMPLE

A horizontally mounted cylindrical drum having six stainless steel parison heating tubes, extending through the drum with their axis parallel to the axis of the drum and located radially an equal distance from the center of the drum and angularly separated by 60°, was steamed out with steam to remove noncondensable vapors and filled with water to a level such that the liquid water did not touch the surface of any tubes when the drum was rotated. The drum was heated by electrical heaters from the bottom by means of radiation so as to maintain a temperature of about 325° F. in the drum. The pressure in the drum was measured and found to correspond very closely to the vapor pressure of water at this temperature. Several parisons were inserted into the drum, heated as the drum was rotated, and withdrawn. These heated parisons were inserted immediately into a blow-molding machine and blown into oriented bottles having excellent clarity and high impact strength.

While this invention has been described in detail for the purpose of illustration, it is not to be construed as limited thereby, but is intended to cover all changes and modifications within the spirit and scope thereof.

I claim:

1. Apparatus for heating a thermoplastic parison comprising in combination: a hollow heating wheel having substantially parallel side plates, an inner hub sealed to said side plates, and an outer wall connecting said side plates around the periphery of said wheel to form a hollow annular space; hollow parison-receiving means comprising at least one row of tubes disposed through said hollow annular space, each tube being sealed at one end to one of said side plates and at the other end to the other of said side plates, so as to prevent communication between said hollow annular space and the interior of said parison-receiving means, the interior of said parison-receiving means being open to the atmosphere; means to heat a liquid sealed within said hollow annular space sufficiently to vaporize said liquid; means to insert parisons in said parison-receiving means; means for removing heated parisons from said parison-receiving means; and means to rotate said wheel about an axis.

2. Apparatus according to claim 1 wherein said axis is disposed concentrically with said hub and is in a horizontal plane.

3. Apparatus according to claim 1 comprising in addition a pressure-sensing means in communication with said hollow annular space and means to control said heating means in response to the pressure sensed by said sensing means in order to maintain a closely controlled temperature within said heating block.

4. Apparatus according to claim 1 wherein said wheel is made of stainless steel.

5. A method of heating a thermoplastic parison comprising placing said parison in a parison holding zone within a heating zone, the interior of said parison-holding zone being in open communication with the atmosphere; maintaining the interior of said heating zone substantially free of noncondensable gases; maintaining a liquid in the bottom of said heating zone at a level below said holding zone; vaporizing said liquid; condensing a portion of said thus vaporized liquid on the outer surface of said holding zone so as to transfer heat to said holding zone and thereafter to said parison by means of conduction; maintaining said interior of said parison holding zone sealed from said vaporized liquid; and removing said thus heated parison from said parison-holding zone.

6. A method according to claim 5 wherein the pressure is sensed within said heating zone and heat to said heating zone is adjusted in response to the sensed pressure.

7. A method according to claim 5 wherein said heating zone rotates about an axis.

8. A method according to claim 6 wherein said parisons are heated to a temperature of 1 to 50° below the crystalline melting point thereof.

9. A method according to claim 8 wherein said parisons comprise polypropylene.